United States Patent
Novack et al.

(10) Patent No.: US 8,566,581 B2
(45) Date of Patent: *Oct. 22, 2013

(54) SECURE INTER-PROCESS COMMUNICATIONS

(75) Inventors: Brian M. Novack, St. Louis, MO (US);
Joe M. Jimerson, Ballwin, MO (US);
Denis L. Bagsby, Waterloo, IL (US);
Brian M. Thomas, Olivette, MO (US);
Hari K. Simhadri, Ballwin, MO (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 141 days.

This patent is subject to a terminal disclaimer.

(21) Appl. No.: 12/963,110

(22) Filed: Dec. 8, 2010

(65) Prior Publication Data

US 2011/0078447 A1    Mar. 31, 2011

Related U.S. Application Data

(63) Continuation of application No. 10/927,126, filed on Aug. 27, 2004, now Pat. No. 7,877,608.

(51) Int. Cl.
*H04L 29/06* (2006.01)
*H04L 9/32* (2006.01)
*G06F 7/04* (2006.01)

(52) U.S. Cl.
USPC ............. 713/156; 713/157; 713/171; 726/2; 726/10

(58) Field of Classification Search
USPC ................ 713/175, 156, 157, 171; 726/2, 10
See application file for complete search history.

(56) References Cited

U.S. PATENT DOCUMENTS

| | | | | |
|---|---|---|---|---|
| 5,515,439 | A | * | 5/1996 | Bantz et al. .................. 713/156 |
| 5,781,633 | A | * | 7/1998 | Tribble et al. ................ 713/167 |
| 5,974,550 | A | * | 10/1999 | Maliszewski ..................... 726/2 |
| 6,148,083 | A | | 11/2000 | Fieres et al. |
| 6,324,648 | B1 | | 11/2001 | Grantges, Jr. |
| 6,330,677 | B1 | * | 12/2001 | Madoukh ........................... 726/2 |
| 6,612,994 | B2 | * | 9/2003 | Bocek et al. ................. 600/508 |
| 6,904,522 | B1 | | 6/2005 | Benardeau et al. |
| 6,976,164 | B1 | * | 12/2005 | King et al. .................... 713/156 |
| 7,130,999 | B2 | | 10/2006 | Yasala et al. |
| 7,178,023 | B1 | * | 2/2007 | Ganapathy .................... 713/167 |
| 7,454,758 | B2 | * | 11/2008 | Chickering ................... 719/313 |
| 7,461,144 | B1 | | 12/2008 | Beloussov et al. |
| 7,529,929 | B2 | | 5/2009 | Asokan et al. |
| 7,657,760 | B2 | * | 2/2010 | Teramoto et al. ............. 713/194 |
| 7,908,333 | B2 | * | 3/2011 | Haury ........................... 709/207 |
| 2002/0066018 | A1 | * | 5/2002 | Linnartz ....................... 713/171 |
| 2002/0116646 | A1 | | 8/2002 | Mont et al. |
| 2002/0144108 | A1 | | 10/2002 | Benantar |
| 2003/0023880 | A1 | | 1/2003 | Edwards et al. |
| 2003/0115456 | A1 | | 6/2003 | Kapoor |
| 2003/0120782 | A1 | | 6/2003 | Bortoloso et al. |
| 2003/0167403 | A1 | | 9/2003 | McCurley et al. |

(Continued)

*Primary Examiner* — Mohammad W Reza
(74) *Attorney, Agent, or Firm* — Greenblum & Bernstein, P.L.C.

(57) ABSTRACT

Securing inter-process communications includes receiving, from a device that supports a first process that is an instantiation of a first application being executed, a request to initiate inter-process communications. Securing inter-process communications also includes replying to the device with a request for information of a first digital certificate that uniquely authenticates an identity of the first process. An identity of a second process that is a distinct instantiation of the first application is authenticated using a second digital certificate distinct from the first digital certificate.

18 Claims, 4 Drawing Sheets

(56) References Cited

U.S. PATENT DOCUMENTS

| | | |
|---|---|---|
| 2003/0226012 A1* | 12/2003 | Asokan et al. ............... 713/156 |
| 2004/0010714 A1 | 1/2004 | Stewart |
| 2004/0031033 A1* | 2/2004 | Chandra et al. ............... 718/102 |
| 2004/0054795 A1 | 3/2004 | Wheater |
| 2004/0098595 A1 | 5/2004 | Aupperle et al. |
| 2004/0103312 A1 | 5/2004 | Messerges et al. |
| 2004/0187001 A1 | 9/2004 | Bousis et al. |
| 2006/0264202 A1* | 11/2006 | Hagmeier et al. ............ 455/411 |

* cited by examiner

| Digital Certificate 300 |
|---|
| Certificate Protocol and Version Number |
| Certificate Issuer/Serial Number |
| Public Key Information (Algorithm and Representation) |
| Validity Period |
| Subject Information (Process, User ID/Name/Email Address/Organization/Country) |
| Issuer's Public Key |
| Signature |

FIGURE 4

SECURE INTER-PROCESS COMMUNICATIONS

CROSS REFERENCE PARAGRAPH

The present application is a continuation of pending U.S. patent application Ser. No. 10/927,126, filed on Aug. 27, 2004, the contents of which are expressly incorporated herein by reference in their entireties.

BACKGROUND OF THE INVENTION

1. Field of the Invention

The present invention relates to inter-process communications (IPC). More particularly, the present invention relates to using digital certificates to secure inter-process communications.

2. Background Information

A need exists to secure inter-process communications. Currently, communications security efforts are often directed to authenticating the identity of a person involved in a communications session. However, inter-process communications occur between processes rather than persons. For example, inter-process communications are typically communications that involve one process controlling another process or communications that involve two processes sharing common data and/or a common memory. Accordingly, security efforts for inter-process communications are typically limited to obtaining an address for a computer supporting a particular process. However, computers can be co-opted, such that obtaining a computer's address is not a guarantee that inter-process communications to or from the computer are secured.

As another example, when a user interacts with an application server over the internet, a process running on the application server may request the services of a process running on a back-end server. The security of the inter-process communications is conventionally limited to obtaining the address of the application server and the back end server. However, obtaining the address of the application server and/or the back end server is not a guarantee that inter-process communications between the application server and the back end server are secured. Rather, as described above, such inter-process communications are susceptible to corruption when either computer is co-opted.

As yet another example, so called "peer-to-peer" networks involve unmanaged and unmonitored computers that each have similar capabilities and responsibilities (in contrast to, e.g., client/server networks). Inter-process communications are particularly susceptible to abuse in a peer-to-peer network because communications are often not monitored by network administrators or network monitors. Rather, users are often trusted to manage their own security. However, due to the nature of inter-process communications, users may not even be aware when inter-process communications occur between their computer and another computer in a peer-to-peer network, let alone whether such inter-process communications are secure.

Accordingly, a need exists to secure inter-process communications.

BRIEF DESCRIPTION OF THE DRAWINGS

The present invention is further described in the detailed description that follows, by reference to the noted drawings by way of non-limiting examples of embodiments of the present invention, in which like reference numerals represent similar parts throughout several views of the drawing, and in which.

DETAILED DESCRIPTION

The present invention enables secure inter-process communications. The implementation of secure inter-process communications will be described in the context of a client-server network and a peer-to-peer network. Of course, the present invention is also applicable to environments other than the networks described herein, including any network environment that includes inter-process communications between different processes running on one or more computers.

In view of the foregoing, the present invention, through one or more of its various aspects, embodiments and/or specific features or sub-components, is thus intended to bring out one or more of the advantages as specifically noted below.

According to an aspect of the present invention, a method is provided for securing inter-process communications between a first process and a second process. The method includes receiving, from a device that supports the first process, a request to initiate inter-process communications. The method also includes replying to the device with a request for information of a digital certificate that authenticates the identity of the first process.

According to another aspect of the present invention, the method includes sending, to the device, a decryption key that enables decryption of communications encrypted using an encryption key that corresponds to the decryption key.

According to yet another aspect of the present invention, the method includes receiving, from the device, information of a digital certificate that authenticates the identity of the first process According to still another aspect of the present invention, the method includes receiving, from the device, a decryption key that enables decryption of communications encrypted using an encryption key that corresponds to the decryption key.

According to another aspect of the present invention, the first process includes an application that provides a service.

According to yet another aspect of the present invention, the first process executes on a first server and the second process executes on a second server. The first server and the second server are provided within a secured perimeter.

According to an aspect of the present invention, a computer-readable medium is provides that stores a program that secures inter-process communications between a first process and a second process. The computer-readable medium includes a receiving code segment that receives, from a device that supports the first process, a request to initiate inter-process communications. The computer-readable medium also includes a digital certificate requesting code segment that replies to the device with a request for information of a digital certificate that authenticates the identity of the first process.

According to another aspect of the present invention, the computer-readable medium includes a key sending code segment that sends, to the device, a decryption key that enables decryption of communications encrypted using an encryption key that corresponds to the decryption key.

According to yet another aspect of the present invention, the computer-readable medium includes a digital certificate receiving code segment that receives, from the device, information of a digital certificate that authenticates the identity of the first process.

According to still another aspect of the present invention, the computer-readable medium includes a key receiving code segment that receives, from the device, a decryption key that enables decryption of communications encrypted using an encryption key that corresponds to the decryption key.

According to another aspect of the present invention, the first process includes an application that provides a service.

According to yet another aspect of the present invention, the first process executes on a first server and the second process executes on a second server. The first server and the second server are provided within a secured perimeter.

According to an aspect of the present invention, a computer is provided that secures inter-process communications between a first process and a second process. The computer includes a processor that executes the second process. The computer also includes a receiver that receives, from a device that supports the first process, a request to initiate inter-process communications. The computer further includes a transmitter that replies to the device with a request for information of a digital certificate that authenticates the identity of the first process.

According to another aspect of the present invention, the transmitter sends, to the device, a decryption key that enables decryption of communications encrypted using an encryption key that corresponds to the decryption key.

According to yet another aspect of the present invention, the receiver receives, from the device, information of a digital certificate that authenticates the identity of the first process.

According to still another aspect of the present invention, the receiver receives, from the device, a decryption key that enables decryption of communications encrypted using an encryption key that corresponds to the decryption key.

According to another aspect of the present invention, the first process includes an application that provides a service.

According to yet another aspect of the present invention, the device is another computer. The computer and the other computer are provided within a secured perimeter.

Figure 1:
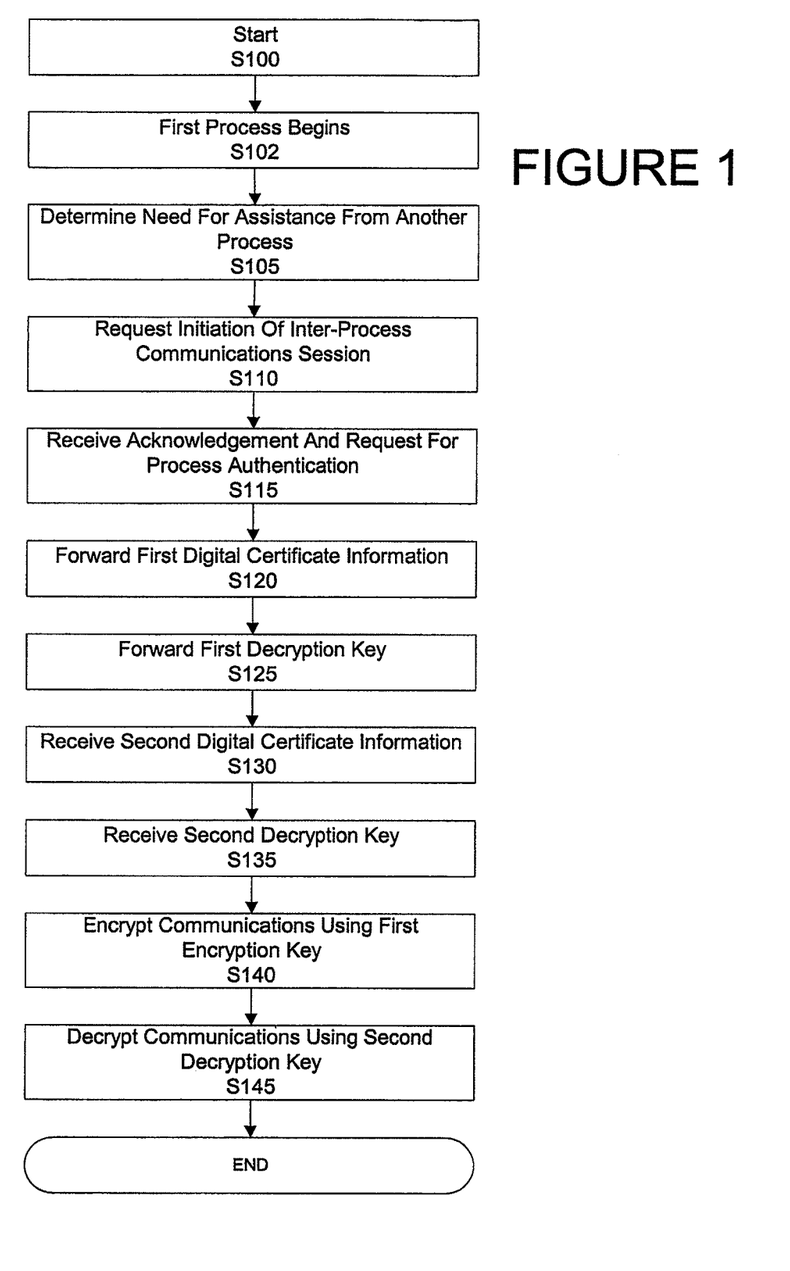
FIG. 1 shows an exemplary flow diagram for secure inter-process communications, according to an aspect of the present invention.

FIG. 1 shows an exemplary method for securing inter-process communications. The process starts at S100, and a first process begins to run on a first computer at S102. A determination is made that the services of a second process are needed at S105, and the first process requests initiation of an inter-process communications session at S110. The request at S110 marks the beginning of inter-process communications. The first computer may send the request to a second computer that runs a second process in the same network. The first computer receives an acknowledgement and a request for authentication at S115. In the example above, the second computer analyzes the initial request and generates an acknowledgement and request for authentication that is received by the first computer at S115.

The analysis on the second computer may be performed by the requested process or another process. As an example, the second computer may analyze all incoming communications requests and demand authentication of all requestors. The second computer may demand authentication of only requestors requesting inter-process communications sessions. Of course, the second computer may demand authentication of requestors for only one or more particularly sensitive processes among many. The analysis at the second computer may be performed by the requested process or by a secondary security program that performs security analysis for all communications or all inter-process communications. Accordingly, when the request is initially received, the second computer determines that authentication is necessary before an inter-process communications session can proceed.

In one example, the first process is running on an application server that provides application services over the internet to requesting clients. The application server interacts with a management server that manages multiple databases as a back-end service. The first process may be run when a user contacts an application server and downloads presentation layer elements of an application to interact with the application server. The application includes instructions to invoke additional processes for predetermined user requests. Accordingly, the application will request the services of a second process at S110.

Architectures and protocols may be provided to ensure that processes on different computers can communicate with each other. For example, remote method invocation (RMI) is a set of protocols that enables Java objects to communicate with other Java objects. Additionally, common object request broker architecture (CORBA) enables objects to communicate with each other without regard to programming languages or operating systems. Common object request broker architecture defines interfaces for individual units of running software that combines functionality and data, i.e., for each object. A client that wants to invoke an operation on an object must use the defined interface to specify the operation it wants to perform.

Alternatively, the inter-process communications may occur on a single computer. For example, dynamic data exchange (DDE) is an inter-process communications system built into the Macintosh, Windows and OS/2 operating systems that enables two running applications to share the same data.

At S120, the computer that supports the first process forwards information of a first digital certificate to the computer that supports the second process. The computer that supports the first process forwards a first decryption key to the second process at S125. At S130, the computer that supports the first process receives digital certificate information from the computer that supports the second process, and at S135 the computer that supports the first process receives a second decryption key from the computer that supports the second process. Accordingly, the computer that supports the first process and the computer that supports the second process exchange keys at S125 and S135 respectively. As noted above, the logic for the secure inter-process communications may be included in the processes that interact in the inter-process communications. Alternatively, the logic may be provided by secondary authentication processes on the computers.

As an example, a secure sockets layer (SSL) may be used to demand authentication from the requesting computer. According to the protocols of the secure sockets layer, also known as hyper-text transfer protocol secure, a communications request involves a request for authentication. Accordingly, the computer that receives the initial communications request may initiate a secure sockets layer session to authenticate the requestor.

A digital certificate is issued by a certification authority (CA) to improve the reliability of communications. The digital certificate is part of a public key infrastructure (PKI) that uses cryptography and digital signatures to ensure the security and authenticity of communications. An exemplary digital certificate complies with ITU-T Recommendation X.509.

Public key infrastructure uses key pairs consisting of a private key and a public key. The digital certificate asserts that a certain public key is bound to a "subject" of the certificate. According to an aspect of the present invention, the "subject" of the digital certificate includes one or more processes, such that the digital certificate asserts that a certain public key is bound to the "process", rather than merely a user or a device. Of course, in addition to binding the public key with a process, the digital certificate may also bind the public key to an owner. The public key is made widely available and the private key is held securely by the subject of the certificate. The public key and private key are mathematically related so that a message encrypted using the private key may only be decrypted using the public key, and vice-versa.

Digital certificates provide numerous benefits, including authentication of source and security of communications. The authentication of source results from the certification authority certifying that the public key is bound to the source. The communications security results from the strong encryption provided using a private/public key pair. The security can be used to exchange symmetric encryption keys that can be used to more efficiently communicate by the sender and recipient of messages. According to an aspect of the present invention, the source may be a process, as well as the device and/or an owner. The owner may be an individual assignee of the public key and/or an entity such as a corporation or organization. In any case, one or more digital certificates are used to secure the communications channel for inter-process communications, according to an aspect of the present invention. As a result of the present invention, a strong assertion of identity is made from either side of a communications channel which can then be used to support authorization and audit needs. Accordingly, the use of digital certificates for inter-process communications provides the benefits of integrity and confidentiality to inter-process communications.

Confidentiality of the transmission is accomplished by encrypting it with the message recipient's public key, as only the holder of the associated private key can decrypt the message. The authentication of source is assured by a "digital signature" mechanism, which is generated by encrypting a secure digest of the message with the private key of the sender. A digital certificate may be stored on any type of computer-readable media, including hard drives, smart cards, flash memory, floppy memory and floppy drives. The digital certificate is installed on a computer and made available to provide secure communications. The digital certificate is retrieved and forwarded to a recipient when a particular process is run and inter-process communications are initiated with the recipient. The digital certificate may be used as a generic authentication tool for all communications involving a particular device or user (i.e., including all inter-process communications), or may be used for only one or more predetermined processes involved in inter-process communications. As an example of the use of digital certificates, according to the secure sockets layer protocols, computers exchange digital certificates to secure communications and authenticate sources and destinations.

Figure 2:
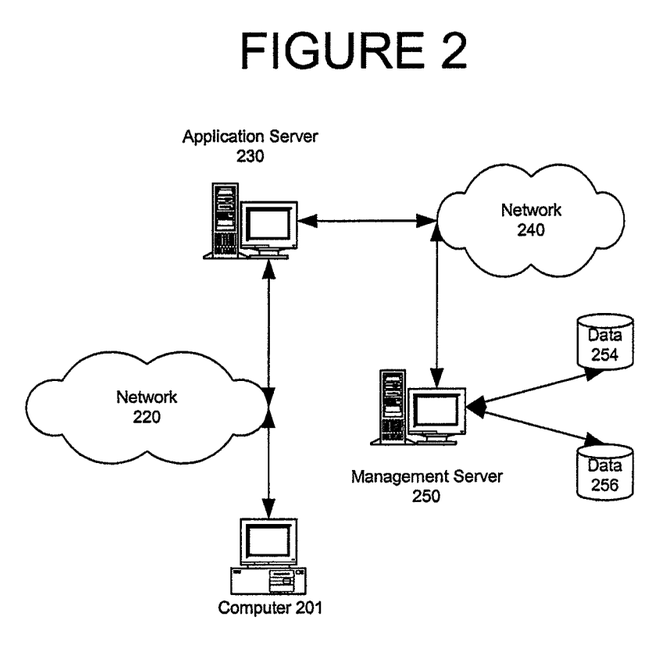
FIG. 2 shows an exemplary network architecture for secure inter-process communications, according to an aspect of the present invention.

FIG. 2 shows an exemplary network architecture for secure inter-process communications. As shown, a computer 201 communicates through a network 220 with an application server 230. As an example, the application server 230 may be a web server that provides internet applications for users. The user downloads a web page onto the computer 201 when the user contacts an internet address corresponding to the desired internet application. Typically, the web page is accessed and downloaded using hyper text transport protocol (HTTP).

The application server 230 communicates through another network 240 with management server 250. As an example, the network 240 may be a secure local area network that enables the application server 230 to obtain back-end processing. Of course, the network 240 may be the same network as the network 220.

The management server 250 manages databases 254 and 256. The databases 254 and 256 store data associated with the service provided by the application server 230. As an example, the application server 230 may provide internet services for accounts of a service provider. Thus, the application server 230 may provide services for a bank, a utility, or a content provider such as a news service. While the user of the computer 201 is intentionally provided with direct access to the application server 230, the configuration of the network shown in FIG. 2 is intended to help deny the user of the computer 201 direct access to the management server 250 and the databases 254, 256. Further, to ensure that the communications between the application server 230 and the management server 250 are secure, a digital certificate is installed on the application server 230, and the digital certificate is bound to the application server 230 and/or a process running on the application server 230.

In an embodiment, the application server 230 and the management server 250 communicate using the secure sockets layer (SSL) protocol (i.e., HTTPS), for secure and trustworthy communications. A secure sockets layer session begins with an exchange of messages known as a handshake. In the embodiment of FIG. 2, the handshake occurs between the application server 230 and the management server 250. The handshake includes the application server 230 contacting the management server 250. In response to the application server 230 contacting the management server 250, the management server 250 sends the application server 230 a digital certificate. The application server 230 responds by providing the management server 250 with a digital certificate. Of course, an exchange of two digital certificates does not need to occur in every case; rather, a single digital certificate may be used when only one party (e.g., the application server 230) to a communications session needs to be authenticated.

The management server 250 may require authentication of the application server 230 for each instance of inter-process communications. In this regard, even if the management server's 250 only function is to process requests for the application server 230, the management server 250 may need to authenticate the application server for each request for inter-process communications when, for example, the application server 230 widely interacts with the public and is therefore subject to unknown risks. The management server 250 may request verification of the application server's 230 address, the particular requesting function, and any other information that will help authenticate the request. Of course, the management server 250 may demand a digital certificate that is bound to the application server 230 or even a particular process that runs on the application server 230.

Digital certificates are provided to the application server 230 and/or the management server 250 by a certification authority upon the request and verification of, e.g., the operator of the application server 230 and the management server 250. However, the digital certificates may also be bound to one or more individual processes on the application server 230 or the management server 250, so that inter-process communications may be authenticated as originating from an authorized process, and not just a predetermined device or user. Alternatively, the digital certificate may be used as appropriate to secure different types of communications, including inter-process communications.

Figure 3:
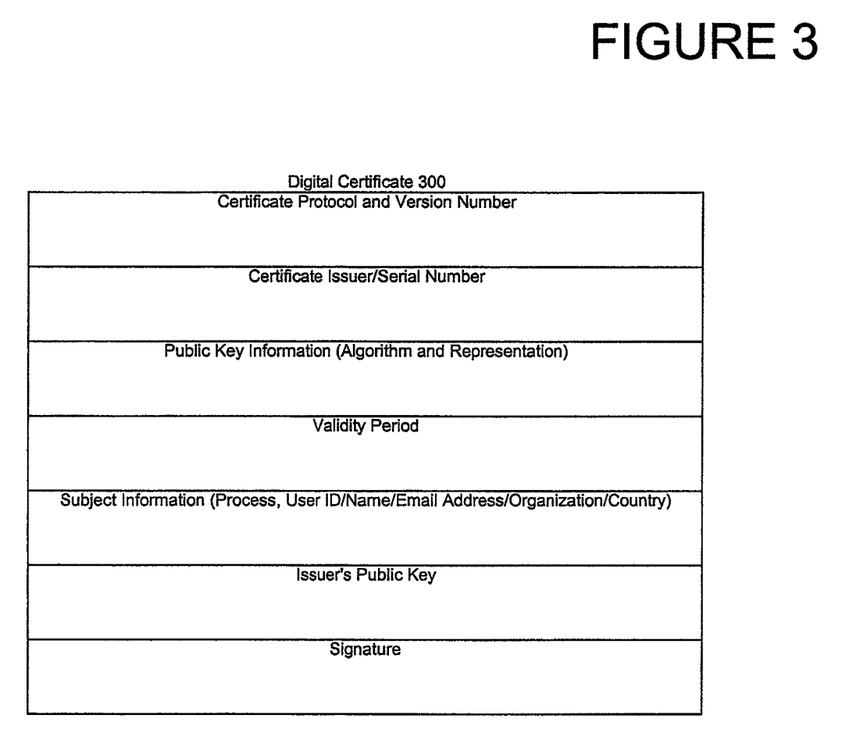
FIG. 3 shows an exemplary digital certificate format for secure inter-process communications, according to an aspect of the present invention.

FIG. 3 shows an exemplary digital certificate 300 for secure inter-process communications. The format of the exemplary digital certificate includes a listing of the protocol and version number of the digital certificate. For example, the digital certificate may conform to the X.509 protocol, version 3. The format of the digital certificate also includes the certification authority that issues the digital certificate, as well as the serial number of the digital certificate. Digital certificates are issued by certification authorities such as Verisign of Mountain View, Calif.

The format of the digital certificate also includes the public key information for the digital certificate. The public key specification typically consists of an algorithm identifier and a machine readable representation of the key's value. The format of the digital certificate also includes the validity period during which the digital certificate is valid.

The format of the digital certificate also includes subject information which identifies the subject to which the public key is bound. In an embodiment, the public key is bound to only one or more processes for a specified device. The process may be identified by a process or product identification number, a file size, a file name, a file type, a process address or protocol, or any other information that can be used to identify a particular process. Because the digital certificate asserts that the public key is bound to only a particular process, inter-process communications can be secured even when the device that supports the secured process has another process, installed by a hacker, which attempts to proceed with inter-process communications. In other words, the digital certificate secures the inter-process communications for a particular process, such that attempts to communicate by unbound processes will be refused.

Of course, a digital certificate and public key according to the present invention need not be bound to only specified processes for a device; rather, the digital certificate and public key may be bound to all processes associated with the device. In this regard, the digital certificate may be used for numerous secure inter-process communications. Of course, a digital certificate may also be bound to a particular person or organization as a subject. The device or person may be identified by a user identifier, a user's actual name, an email address, an organization, and/or a country of use. However, according to the embodiment shown in FIG. 3, the digital certificate secures only the process or processes identified by the digital certificate.

Figure 4:
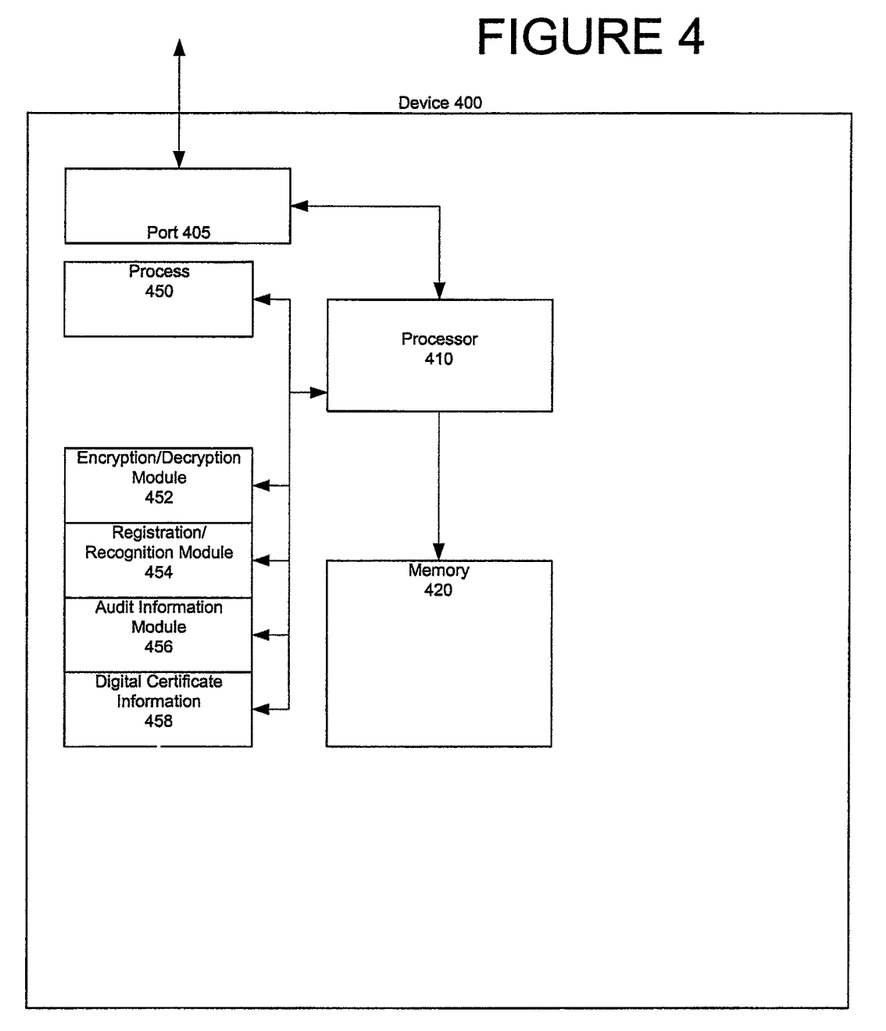
FIG. 4 shows an exemplary device employing secure inter-process communications, according to an aspect of the present invention.

FIG. 4 shows an exemplary device layout for a device that employs secure inter-process communications. The device 400 includes a port 405 which is used to communicate according to a particular communications protocol. The communications sent and received by the port 405 are processed by a processor 410. The device 400 also includes internal memory 420, which may be read only memory (ROM) and/or random access memory (RAM). As an example, read only memory may store fixed operating procedures, e.g., operating system instructions, for the device including instructions for routines and subroutines unrelated to the security of inter-process communications. The random access memory may store data as directed by a programmer or user of the device.

The device 400 executes a process 450. The process 450 uses or is used by another process. The other process may be on the same device 400 or a different device. When the process 450 executes secure inter-process communications, the device 400 uses digital certificate information 458 of a digital certificate that is bound to the device 400 and/or the process 450. An encryption/decryption module 452 encrypts the communications using the public key of the digital certificate and forwards the encrypted information to the processor 410 before the information is sent to the other process by the port 405. Of course, the device also sends the digital certificate information 458 to the other process so that the other process can authenticate the inter-process communications from the device.

The device 400 also includes a registration/recognition module 454 which may be used to limit communications to only registered and/or recognized processes. For example, the registration/recognition module 454 may limit communications to communications that conform to a particular format. In this regard, Java remote method invocation architecture only facilitates communications with objects that conform to the remote method invocation architecture. In contrast, the common object request broker architecture enables inter-process communications between objects that conform to other protocols. Of course, the registration/recognition module 454 may be used in a local or otherwise secure network to also only accept inter-process communications from pre-registered devices in the secure local network. Accordingly, the use of digital certificates according to the present invention enhances the security provided in even an otherwise secure network to ensure that unauthorized processes from other devices in the network cannot be used to address unauthorized interaction initiated by an unauthorized process.

The device shown in FIG. 4 also includes an audit information module 456. The audit information module 456 stores information related to inter-process communications sessions, including unsuccessful attempts to establish inter-process communications. For example, the audit information module 456 may store information related to the identity of other processes with which inter-process communications are established. Additionally, the audit information module 456 may record information identifying the devices, addresses, users and digital certificates (including certification authority and serial number) corresponding to the other process.

The device 400 is not limited to a client or server. Rather, the device 400 may be a router, a proxy, an intermediary, or any other type of device that supports a process which at least occasionally requires inter-process coordination and communication. In an embodiment, the device 400 is a peer in a peer-to-peer network. Peer-to-peer network devices are particularly in need of the present invention, as peer devices often communicate with unknown devices that can be used to initiate unauthorized interaction. Using secure inter-process communications as described herein allows a device to ensure the authenticity of not just the (unknown) user and device from which communications are received, but also the actual process supported by a peer communications device. In this regard, a user in a peer-to-peer network may not always be aware when their device has been co-opted to initiate unauthorized interactions. Accordingly, unauthorized interactions can be addressed because communications are authenticated for the specified processes on the device 400. Accordingly, if an unauthorized interaction is attempted in a peer-to-peer network, the unauthorized interaction is effectively discouraged because the device 400 will not accept communications from processes that are not authenticated.

Of course, a computer that demands authentication may also be subjected to authentication demands by another (third party) computer. In this regard, a certificate may be used to initiate an initial inter-process communication session between a first process and a second process. Further, the certificate may be used to initiate a subsequent inter-process communication session between the second process and a third process in the same manner as is described for the authentication between the first process and a second process. Optionally, the computer that supports the first process or the second process may use the same credentials in either role (initiator or responder) for the subsequent process.

An exemplary use of secure inter-process communications includes securing so-called secure networks. In this regard, secure networks often focus security efforts on preventing impostors from gaining access to the network. For example, a secure local computer network may route all communications through a firewall server that examines all incoming and outgoing communications to ensure they do not present a security risk. However, a lower level of security is provided for communications between addresses within the secure network. In particular, security for communications between addresses in a network is often limited to source and destination authentication. Accordingly, once an impostor gains access to the secure network, the impostor can wreak havoc on the devices in the network. However, using secure inter-process communications according to the present invention, each inter-process communications session may be secured, even between devices in the network.

As another example, inter-process communications between devices on an internal network for a corporation can be secured using the present invention. Digital certificates can be installed for one or more processes on particular devices on the network such that inter-process communications are only enabled for the specified processes and/or specified devices.

Additionally, as noted above, the use of secure inter-process communications according to the present invention is particularly well-suited to peer-to-peer networks, where devices are often connected over insecure public networks. In this regard, if a device in a peer-to-peer network only accepts communications from other devices which have digital certificates installed for specified processes, inter-process communications will be authenticated to ensure that unauthorized processes are not being propagated through the network.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

The device in FIG. 4 may include multiple processes that communicate with each other using the secure inter-process communications of the present invention. Additionally, although the terms "client" and "server" are used to refer to devices, the devices may be defined and distinguished by a set of software instructions installed as a pre-packaged program. Further, while examples of the uses of the present invention include secure client/server networks and peer-to-peer networks, secure inter-process communications can be used to enhance security in any inter-process communications environment. Further, while the embodiment shown in FIG. 2 only shows a single computer 201 and a single application server 230, secure inter-process communications can be used to enhance security for multiple application servers 230 belonging to a single entity or multiple users using computers 201. Additionally, while networks 220 and 240 are separately designated in FIG. 2, the networks may be the same, such as an internet protocol (IP) network. Further, while a certification authority is discussed in the context of the present invention, a certification authority is not shown in the figures. In this regard, a certification authority may communicate over the network 220 and/or the network 240 to provide digital certificates to the application server 230 and the management server 250. Of course, the digital certificates may be provided by the certification authority as portable memory modules that are installed on the application server 230 or the management server 250. Furthermore, the entity that provides the application server 230 and/or the management server 250 may also act as a certification authority for its customers using the computers 102.

Additionally, the steps shown in the figures may be performed in a different order, or not at all. For example, the first digital certificate information and the first decryption key may be performed as a single step in the method shown in FIG. 1. Additional steps may also be performed in the embodiment of FIG. 1. For example, information related to the process shown in FIG. 1 may be stored for later auditing. Additionally, the procedures relating to initiating the session between computers, e.g., the computer 201 and the application server 230, are not specified in FIG. 1, although a communications session may be established between such computers before the secure inter-process communications of the present invention begins. Accordingly, any method of inter-process communications can be secured using digital certificates that authenticate the identity of devices and/or processes within the purview of the present invention.

In accordance with various embodiments of the present invention, the methods described herein are intended for operation as software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that the software implementations of the present invention as described herein are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. A digital file attachment to email or other self-contained information archive or set of archives is considered a distribution medium equivalent to a tangible storage medium. Accordingly, the invention is considered to include a tangible storage medium or distribution medium, as listed herein and including art-recognized equivalents and successor media, in which the software implementations herein are stored.

Although the present specification describes components and functions implemented in the embodiments with reference to particular standards and protocols, the invention is not limited to such standards and protocols. Each of the standards for digital certificate format (e.g., X.509), transfer protocols (e.g., HTTP, HTTPS/SSL), packet switched network transmission (e.g., IP) and interface protocols and architectures (e.g., CORBA, RSI) represent examples of the state of the art. Such standards are periodically superseded by faster or more efficient equivalents having essentially the same functions. Accordingly, replacement standards and protocols having the same functions are considered equivalents.

What is claimed is:

1. A method for securing inter-process communications, comprising:
receiving, from a device that supports a first process that is an instantiation of a first application being executed, a request to initiate inter-process communications; and
replying to the device with a request for information of a first digital certificate that uniquely authenticates an identity of the first process,
wherein an identity of a second process that is a distinct instantiation of the first application, distinct from the first process, and supportable by the same device, is not authenticable by the first digital certificate, and
wherein the second process is an impersonated process, to be installed by an unauthorized source attempting to proceed with the inter-process communications.

2. The method of claim 1, further comprising:
sending, to the device, a decryption key that enables decryption of communications encrypted using an encryption key that corresponds to the decryption key.

3. The method of claim 1, further comprising:
receiving, from the device, a decryption key that enables decryption of communications encrypted using an encryption key that corresponds to the decryption key.

4. The method of claim 1,
wherein authentication is required for each instance of the inter-process communications.

5. The method of claim 1,
wherein a third process involved in the inter-process communications executes on a distinct device, the device and the distinct device being provided within a secured perimeter.

6. The method according to claim 1,
wherein the device is a peer in a peer-to-peer network.

7. The method according to claim 1,
wherein the device uses the first digital certificate in a responder role to respond to a request for inter-process communications.

8. A non-transitory tangible computer readable storage medium that includes a set of instructions for securing inter-process communications, the set of instructions directing processor to perform acts of:
receiving, from a device that supports a first process that is an instantiation of a first application being executed, a request to initiate inter-process communications; and
replying to the device with a request for information of a first digital certificate that uniquely authenticates an identity of the first process,
wherein an identity of a second process that is a distinct instantiation of the first application, distinct from the first process, and supportable by the same device, is not authenticable by the first digital certificate~ and
wherein the second process is an impersonated process, to be installed by an unauthorized source attempting to proceed with the inter-process communications.

9. The non-transitory tangible computer readable storage medium of claim 8,
wherein the first digital certificate does not authenticate an identity of a third process that is an instantiation of a second application that is distinct from the first application.

10. The non-transitory tangible computer readable storage medium of claim 8,
wherein the first application is executed on an application server that interacts with a management server that manages a database as a backend service.

11. The non-transitory tangible computer readable storage medium of claim 10,
wherein a third process executes on the management server.

12. The non-transitory tangible computer readable storage medium of claim 10,
wherein a second application is executed on the management server, and
wherein the second application instantiates a third process.

13. The non-transitory tangible computer readable storage medium of claim 10,
wherein the first digital certificate is issued by a certification authority.

14. A computer that secures inter-process communications, comprising:
a processor that executes a third process;
a receiver that receives, from a device that supports a first process that is an instantiation of a first application being executed, a request to initiate inter-process communications; and
a transmitter that replies to the device with a request for information of a first digital certificate that uniquely authenticates an identity of the first process,
wherein an identity of a second process that is a distinct instantiation of the first application, distinct from the first process, and supportable by the same device, is not authenticable by the first digital certificate, and
wherein the second process is an impersonated process, to be installed by an unauthorized source attempting to proceed with the inter-process communications.

15. The computer of claim 14,
wherein the inter-process communications are not authenticated as originating from a specified device.

16. The computer of claim 14,
wherein the inter-process communications are not authenticated as originating from a specified user.

17. The computer of claim 14,
wherein the inter-process communications are secured when the second process is installed on the device by an unauthorized user attempting to proceed with the inter-process communications.

18. The computer of claim 14,
wherein the third process is an instantiation of a second application.

* * * * *